United States Patent [19]

Whitney

[11] 4,061,292

[45] Dec. 6, 1977

[54] BI-DIRECTIONAL ROTARY DRIVE MECHANISM

[75] Inventor: James C. Whitney, Fairfield, Conn.

[73] Assignee: Dictaphone Corporation, Rye, N.Y.

[21] Appl. No.: 678,704

[22] Filed: Apr. 20, 1976

[51] Int. Cl.$^2$ .......................... G03B 1/04; G11B 15/32
[52] U.S. Cl. ...................................... 242/201; 74/810
[58] Field of Search ............... 242/192, 200, 201–204, 242/210; 74/665 A, 665 P, 810, 812

[56] References Cited

U.S. PATENT DOCUMENTS

| 2,673,041 | 3/1954 | Hittle | 242/192 |
|---|---|---|---|
| 2,951,653 | 9/1960 | Haenel | 242/201 |
| 3,145,941 | 8/1964 | Proctor | 242/192 |
| 3,608,847 | 9/1971 | Hufford | 242/204 |

*Primary Examiner*—Leonard D. Christian
*Attorney, Agent, or Firm*—Arthur V. Smith

[57] ABSTRACT

Apparatus for selectively imparting rotary motion to two spaced apart rotary members which may be used in a web or tape transport mechanism to bi-directionally transport a web or tape. In a preferred embodiment, this apparatus is used as a tape transport in a magnetic recording and/or playback machine. A drive roll in the tape transport mechanism selectively contacts one of the rotary members. The drive roll is coupled to a bi-directional drive motor and includes an extending shaft segment. A string member, tensioned at each end, has an intermediate portion thereof deployed about the extending shaft segment of the drive roll. Upon rotation of the drive motor in one direction, the drive roll and shaft segment rotate and the frictional forces between the string member and the shaft segment cause the shaft segment to traverse the string in a corresponding direction so as to bring the drive roll into contact with one of the rotary members. When the drive motor is reversed, the shaft segment rotates in the opposite direction causing the drive roll and extending shaft segment to traverse the string in the opposite direction to urge the drive roll into contact with the other rotary member.

In the embodiment wherein this apparatus is used in a tape transport system, the respective rotary members are supply and take-up reel disc members, respectively, and depending upon the direction of rotation of the drive shaft, tape is transported from the supply reel in a fast foward mode, and is rewound on the supply reel in a fast rewind mode.

15 Claims, 4 Drawing Figures

BI-DIRECTIONAL ROTARY DRIVE MECHANISM

BACKGROUND OF THE INVENTION

This invention relates to drive apparatus for selectively imparting rotary motion to two spaced apart rotary members and, more particularly, to bi-directional web driving apparatus which, in one embodiment, can be used as a tape transport.

In bi-directional driving apparatus, such as in web drive mechanisms, tape transport systems, and the like, it is desirable to provide bi-directional drive capability to the web or tape drive members. In some applications, it is often desirable to switch rapidly and efficiently from one driving direction to the opposite driving direction. For example, in a tape transport system which can be used in a tape recording/playback apparatus, it often is necessary for an operator to move tape in either fast forward or fast reverse direction. Such tape movement may be initiated immediately following a record or playback operation. Hence, this movement of tape is the well-known fast-forward or rewind modes wherein tape is selectively moved at a much faster rate than during the record or playback modes.

In some tape transport systems, a relatively low speed motor is utilized for the normal forward movement of tape, as during a record or playback mode. A fast-forward motor having a relatively higher speed is provided for the fast forward movement of tape and a rewind motor, also having a relatively higher speed, is provided for the rewind movement of tape. The selective movement of tape thus requires the selective energization of each of these motors. Consequently, it has been found that the inherent electrical and mechanical time delays result in a noticeable delay from the time that a motor initially is energized to the time that the corresponding tape movement is brought up to proper speed. This is particularly objectionable during a recording or playback operation. Also, the requirement of three motors adds to the bulk and cost of the tape transport system.

In a partial solution to this problem of time delays, some tape transport systems are provided with the low speed motor in constant operation. A selective transmission coupling is used to selectively transfer the rotary motion developed by this motor to various components of the system, such as the capstan/pressure-roll combination, the take-up reel, and the like. While this has minimized the delay attending a record or playback operation, the problem of separate high speed motors remains.

In many tape transport systems now in commercial use, the separate high speed motors have been replaced by a single bi-directional high speed motor having a selective transmission so as to couple the motor either to the supply or take-up reel. Heretofore, two solenoids have been used to control this selective transmission. When this type of tape transport system is provided, in, for example, a dictation machine, an additional solenoid must be provided to selectively position the record/playback head in contact with the tape, and sometimes still further solenoids are used for braking functions. Unfortunately, the use of many solenoids adds to the power requirements of the machine, increases the bulk and cost of the overall system, requires more complex control and support mechanisms, and, more significantly, is a source of distracting noise caused by the energization and de-energization of the various solenoids.

In an effort to reduce the number of solenoids in such machines, it has been proposed to control a solenoid so as to exhibit three conditions, or states, with the concurrent control of the tape transport system for each condition. This requires that the solenoid armature have a fully extended displacement, a fully retracted displacement and an intermediate displacement. Since, in general, a low-cost solenoid inherently is provided with two conditions wherein its armature either is fully extended or fully retracted, the requirement of an additional condition in such a solenoid is attended by relatively complex and costly control electronics. Furthermore, there is the additional problem that the intermediate position of the solenoid armature may, over a period of time, vary. Consequently, the mechanical function which is to be controlled by this intermediate armature position may be erroneously performed.

In addition to the aforedescribed undesirable aspects of prior tape transport devices such prior tape transport devices also have the disadvantage that the rapid actuation of mechanical transmissions invariably creates transient noise which is undesirable in a recording machine. Additionally, substantial power is consumed by these solenoid actuating means.

OBJECTS OF THE INVENTION

Therefore, it is an object of the present invention to provide improved driving apparatus for selectively imparting rotary motion to two rotary members.

Another object of this invention is to provide improved driving apparatus for the bi-directional transport of a web.

Yet another object of this invention is to provide improved driving apparatus to be used in a tape transport system for bi-directionally driving a tape member between supply and take-up reels.

A still further object of this invention is to provide driving apparatus to be used in a tape transport system having a relatively simple transmission mechanism exhibiting low cost and low mass whereby a supply reel or a take-up reel can be selectively driven at a relatively high speed.

Another object of this invention is to provide driving apparatus to be used in a tape transport system which is virtually noiseless in operation.

Another object of this invention is to provide a driving apparatus to be used in a tape transport system which consumes minimum power.

Another object of this invention is to provide driving apparatus to be used in a tape transport system in a tape recording/playback machine having only a single two-condition multi-purpose solenoid which is used to selectively couple a relatively high speed driving source to the supply and take-up reels, to selectively place a record and/or playback head into contact with the tape and to selectively brake the tape transport system.

An additional object of this invention is to provide improved driving apparatus to be used in a tape transport system wherein a drive roll is driven from a bi-directional source, the drive roll being displaced into driving contact either with the supply or take-up reel depending upon its own direction of rotation, and without requiring a solenoid device for such displacement.

Various other objects and advantages of the present invention will become apparent from the ensuing detailed description, and the novel features will be particularly pointed out in the appended claims.

SUMMARY OF THE INVENTION

In accordance with the present invention, apparatus for selectively imparting rotary motion to two spaced rotary members is provided. The apparatus is a web or tape transport mechanism comprising a drive roll adapted to selectively contact one of the rotary members; a bi-directional drive motor for driving the drive roll; and a string member tensioned at each end and having an intermediate portion thereof deployed about a shaft extension of the drive roll shaft. Actuation of the drive motor in one direction rotates the drive roll and its shaft extension. The frictional forces between the string member and the drive roll shaft extension cause the shaft and drive roll to be displaced in a direction corresponding to its direction of rotation so that the drive roll is urged into driving contact with a corresponding one of the rotary members. In like manner, actuation of the drive motor in the opposite direction urges the drive roll into driving contact with the other rotary member.

This invention finds particular application in a tape transport system for a recording and/or playback device which may be provided with a single two-condition multi-purpose solenoid. In one aspect of this use of the invention, the range of displacement of the drive shaft is constrained when the solenoid is in a first position, whereby the drive roll is prevented from contacting either of the rotary members; and this constraint is removed when the solenoid is in its second position.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
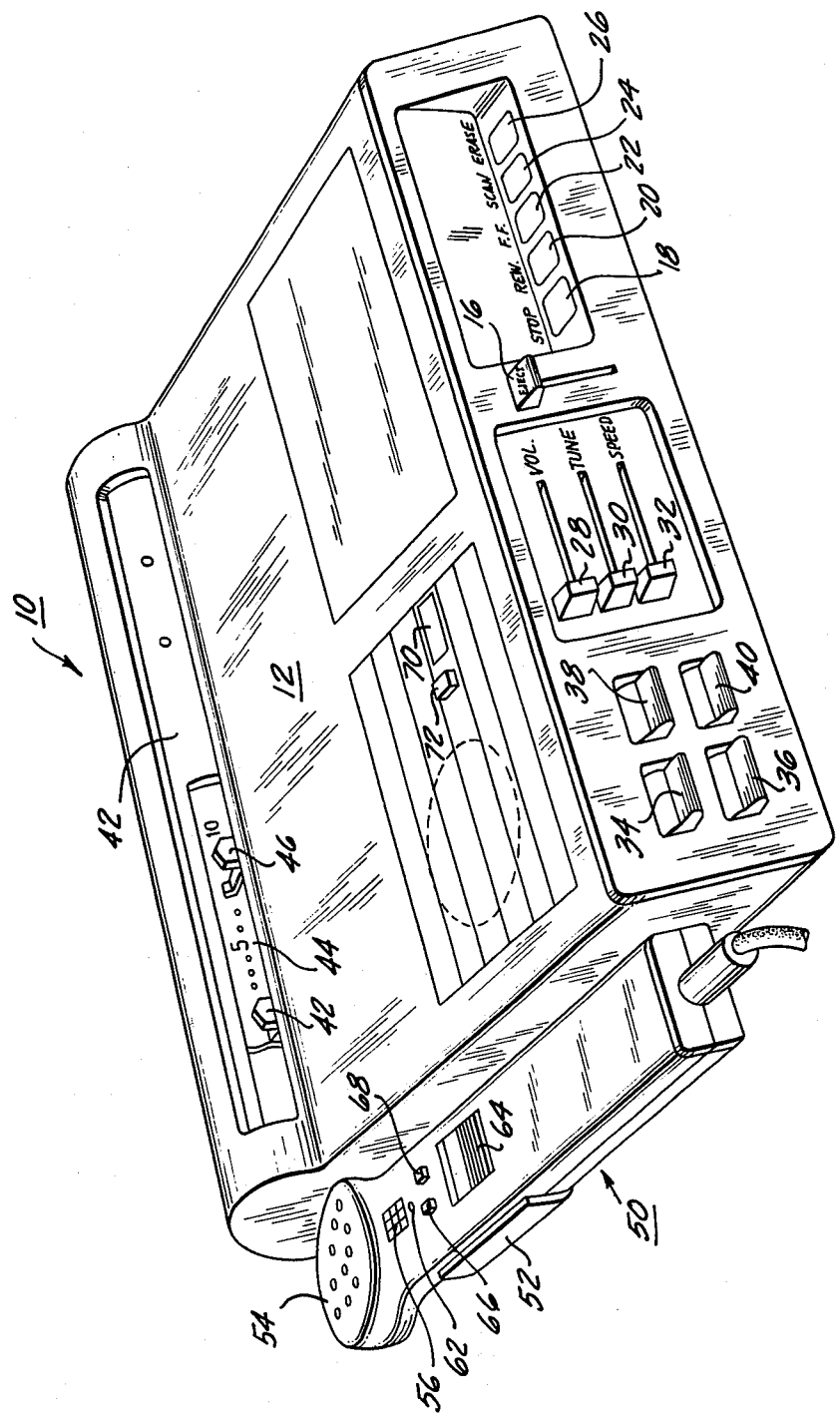
FIG. 1 is a perspective view of a dictation machine in which the present invention finds ready application.

Referring now to the drawings, wherein like reference numerals are used throughout, the present invention will be described in the environment of a web transport system, such as a tape transport system, used, for example, in a magnetic tape recording and/or playback apparatus. One embodiment of such an apparatus is a dictation machine of a type shown, generally, in FIG. 1. This dictation apparatus 10 includes a housing 12 for a chassis (not shown) upon which the various mechanical elements and electronic circuitry are supported. FIG. 1 also shows various operator-actuated elements, or control switching devices, to effect dictation and/or playback operations. The record medium for the illustrated dictation apparatus 10 is magnetic tape of the type which is self-contained in a cassette housing. Such a magnetic tape cassette is conventional and is comprised of a supply reel and a take-up reel. The cassette housing is provided with various apertures to accommodate reel drive spindles to drivingly engage the supply and take-up reels, and to accommodate a record/playback transducer, or head, which is inserted into contact with the tape. As is conventional, additional apertures are provided to receive an erase head and a pressure roller, the latter cooperating with a capstan for moving the tape past the various heads. In order to accommodate such a tape cassette, the dictation apparatus 10 is provided with a cassette holder compartment 14. Although not shown herein in detail, the cassette holder compartment is provided with a support platform for the cassette housing, various guide mechanisms for the cassette housing and, preferably, a door which is closed to shield the cassette and the machine elements during operation.

Typical of the operator-controlled elements is an eject control 16 which, when actuated, serves to lift the door to the cassette holder compartment and, if a cassette is on its support platform, to eject the cassette for removal. A series of control elements or switches, such as push-buttons or touch-sensitive devices, is provided for an operator to selectively control various machine operations. For example, a stop control 18 is provided to terminate the operation of the dictation apparatus 10 and to place the apparatus in a quiescent mode. For example, when the stop control 18 is actuated, tape movement is arrested and the record/playback head is withdrawn from tape contact. When placed in this mode, dictation apparatus 10 is ready for subsequent placement in another operating mode.

The series of control elements also include a rewind control 20 for rewinding the tape from its take-up reel within the cassette housing to its supply reel as well as a fast-forward control 22 to rapidly move the tape from its supply reel to its take-up reel. In addition, a scan control 24 electronically scans the moving tape for the presence of predetermined control signals thereon while the tape moves in its fast forward direction. As described in greater detail in copending Application Ser. No. 678,697, filed Apr. 20, 1976 and now U.S. Pat. No. 4,051,540 these control signals represent various instructions which are useful in guiding a transcriptionist during transcribe operation. Hence, when actuated, the scan control 24 causes appropriate control apparatus to detect and indicate the relative locations of such control signals.

An erase control 26 is provided for erasing information previously recorded on the magnetic tape. In general, this erase function is performed while the tape is transported between its supply and take-up reels.

Another series of operator-actuated controls is provided to enable an operator to selectively control the audio characteristics of reproduced information. To this effect, a volume control 28, a tone control 30 and a tape-speed control 32 are provided to perform the respective indicated functions.

Yet another series of operator-actuated controls is provided, including an on/off switch 34, a speaker control switch 36 and a conference/dictate switch 38. The illustrated dictation apparatus 10 is provided with a loudspeaker and, additionally, a microphone assembly 50, to be described, which is used with this dictation apparatus also is provided with a loudspeaker. Accordingly, the speaker control switch 36 permits an operator to selectively actuate the loudspeaker of the dictation apparatus or the loudspeaker of the microphone assembly for the reproduction of sound, as desired. The conference/dictate control switch 38 is provided to selectively enable an operator of dictation apparatus 10 to use this apparatus for normal dictation or, alternatively, to record a conference. In the latter mode, the amplification gain of the recording circuits is increased.

An optional telephone control switch 40 is provided to selectively enable an operator to use dictation apparatus 10 to record information directly from a telephone line.

Indicator lights 42, 42A are provided at the rear of dictation apparatus 10 for apprising an operator of the condition of the machine. Positioned adjacent the indicators 42, 42A is a slide index 44 including a scale and a movable slide lever 48 attached to the scale. Slide lever 46 moves in synchronism with the movement of the cassette tape so as to indicate to the operator his present position in respect to the full length of the tape and moves relative to the slide index 44 to indicate tape position.

A microphone assembly 50 is electrically connected to the control electronics included in dictation apparatus 10. For convenience, microphone assembly 50 is supported on a microphone support bracket 52 which may be coupled to the machine housing 12. Microphone assembly 50 includes a sound transducer 56 for converting audio information into corresponding electrical signals, and a loudspeaker 54, described above. In addition, various operator-controlled actuating elements 58, 60, 62 and 64 are provided to enable an operator to control a dictation operation merely by the selective operation of the indicated elements.

These elements include a dictate control slide switch 64 which controls various machine functions. In one position switch 64 places the apparatus in a record mode; in another position switch 64 places the apparatus in a rewind mode; in still another position switch 64 places the apparatus in a playback mode; and in yet another position switch 64 places the apparatus in a neutral or stop mode. Switch 60 places the apparatus in a fast forward tape mode and switch 58, when actuated, places predetermined control signals on the tape indicating that succeeding information is intended to be an instruction, or that the end of a selected piece of dictation has been reached. It is these control signals which are detected in response to the actuation of the scan control 24. Element 62 is a light which indicates the operating mode in which dictation apparatus 10 is conditioned.

As shown in FIG. 1, dictation apparatus 10 is provided with a tape footage counter 70, which may be a conventional digital counter representing the amount of tape which has been transported, and a reset control 72 adapted to reset the count displayed by the counter 70 to a reference, or zero, indication.

The functions of the aforementioned operator-control elements are self-evident. Accordingly, in the interest of brevity, further description thereof is not provided.

Figure 2:
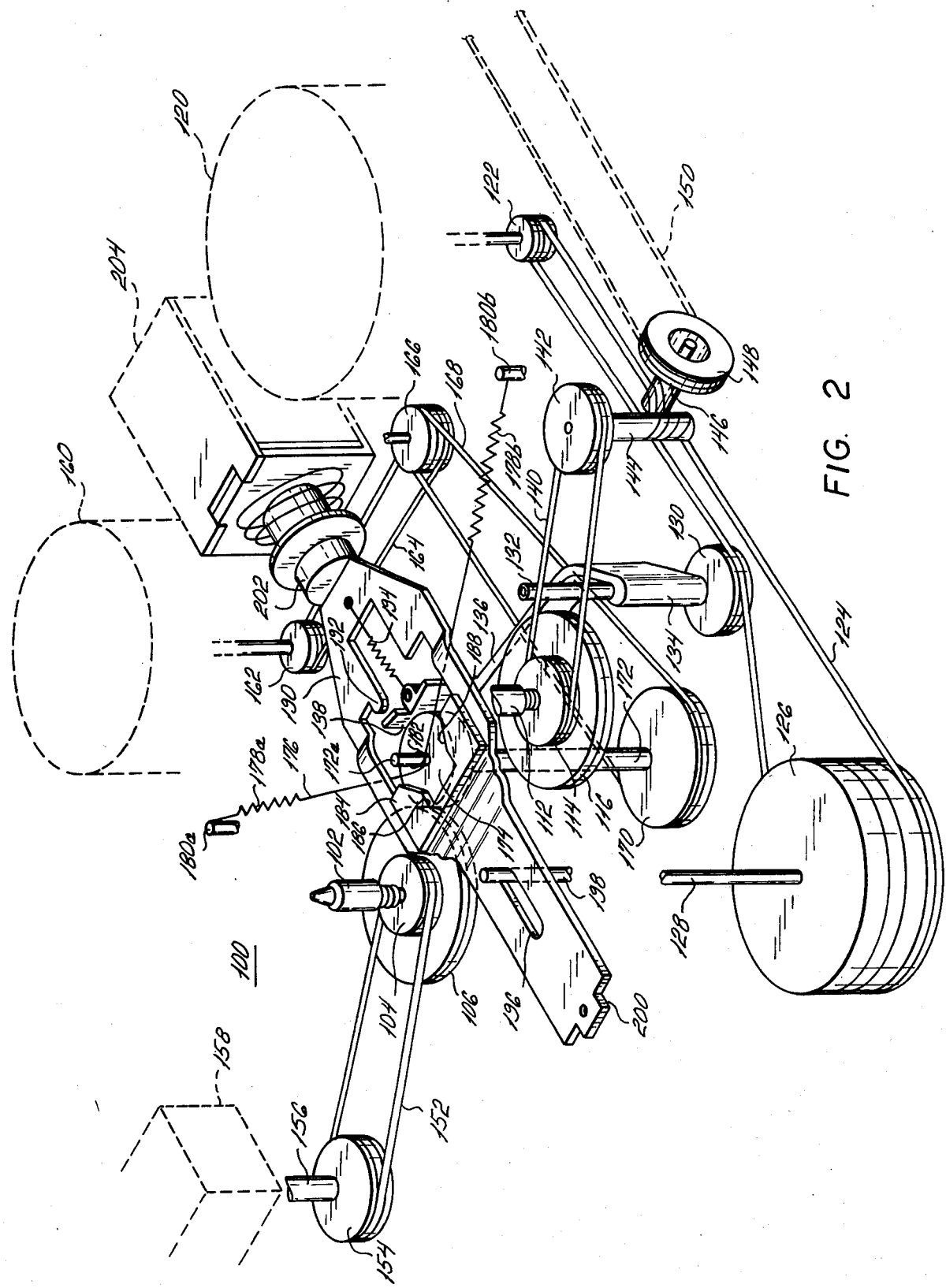
FIG. 2 is a perspective view of components comprising the tape transport system which can be used in the dictation machine of FIG. 1 and which includes the present invention.
Figure 3:
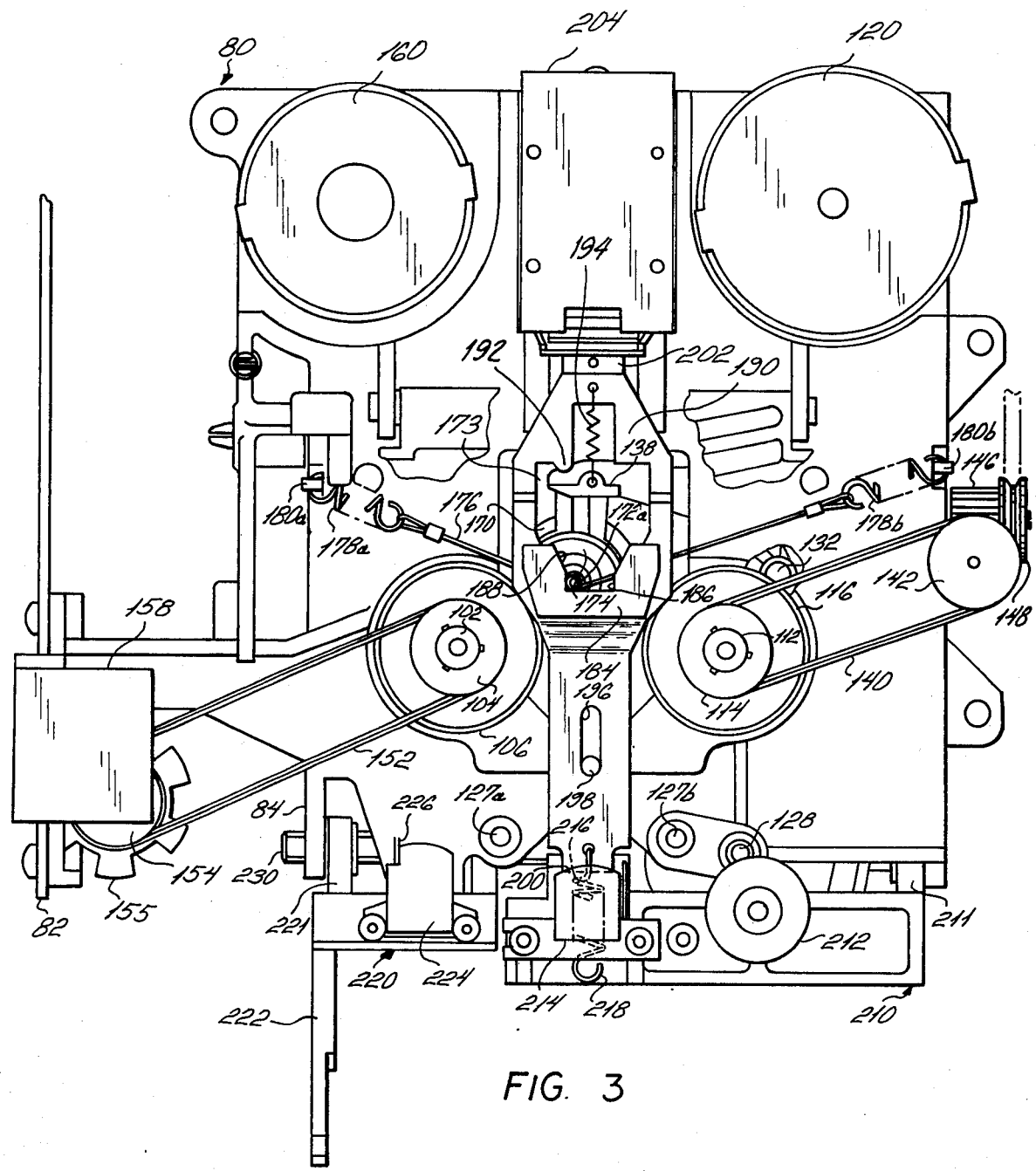
FIG. 3 is a top plan view of the tape transport system shown in FIG. 2 and including additional elements which are used in the dictation machine shown in FIG. 1.
Figure 4:
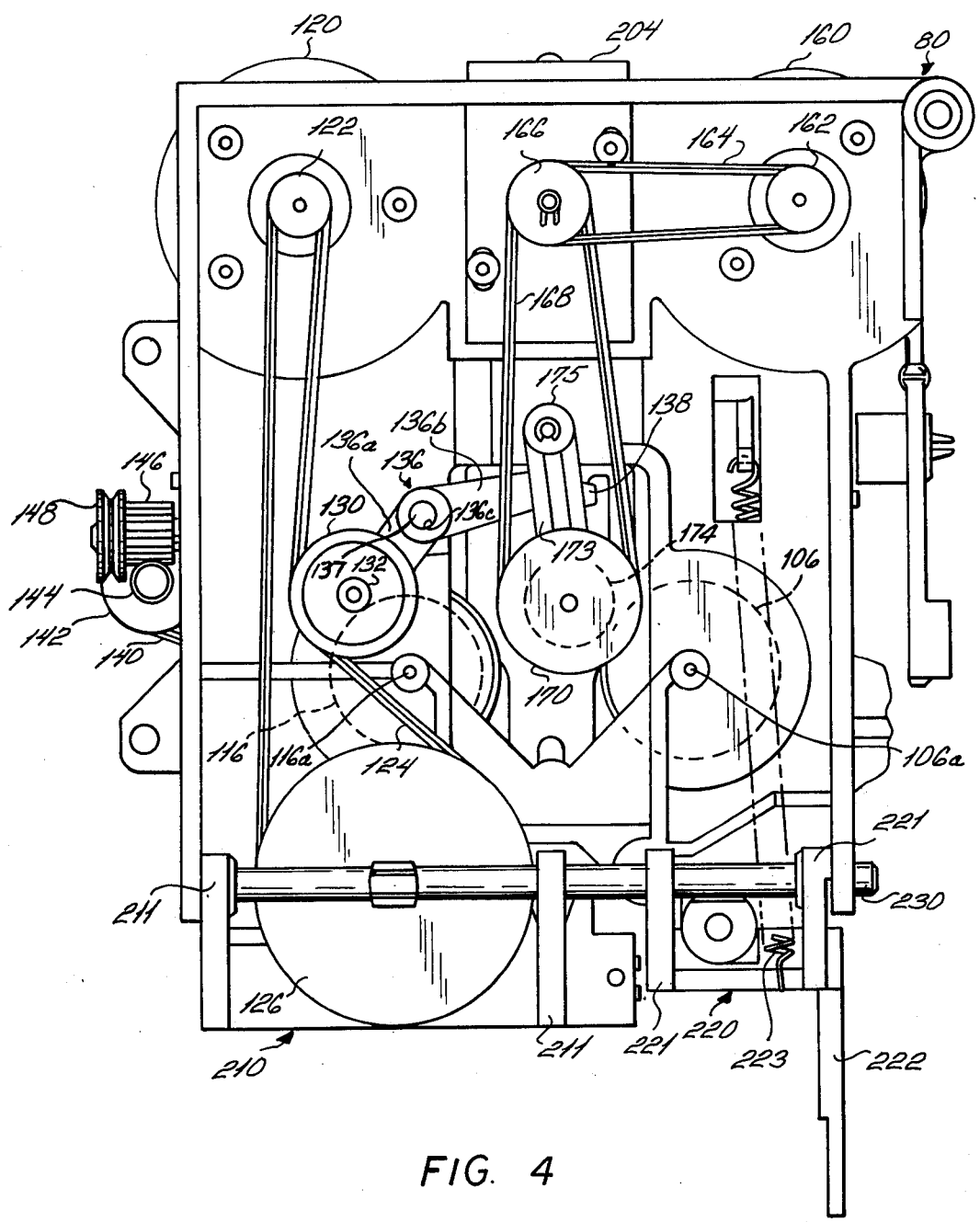
FIG. 4 is a botton plan view of the apparatus shown in FIG. 3.

Referring now to FIGS. 2, 3 and 4, there is illustrated the drive apparatus which can be used in the tape transport system included in the dictation apparatus shown in FIG. 1. In order to facilitate a ready understanding of this drive apparatus, it will be described in a preferred application as a tape transport assembly. However, the present invention need not be limited solely to such an application. The tape transport assembly 100, best shown in perspective in FIG. 2, includes a supply reel spindle 102, a take-up reel spindle 112 and a capstan 128.

As is conventional, the supply reel spindle 102 and the take-up reel spindle 112 are adapted to be received in the supply and take-up reel hubs, respectively, included in the cassette housing. A supply reel pulley 104 is part of the supply reel spindle, as is a supply reel disc 106. Thus, the supply reel spindle, pulley and disc are adapted for integral rotation. As will soon be described, the peripheral surface, or rim, of the supply reel disc 106 is adapted to be frictionally driven and, for this purpose, may be provided with suitable material, such as rubber, or the like. As shown in the bottom view of FIG. 4, the supply reel disc 106 is free to rotate about a fixed shaft 106a which may be secured to the chassis, generally designated by the reference numeral 80 (FIG. 4). In similar fashion, the take-up reel spindle 112 is coupled to a take-up reel pulley 114 and to a reel disc 116, the latter being supported by, and free to rotate about, a suitable shaft 116a (FIG. 4). The peripheral surface, or rim, of the reel disc 116 is provided with suitable material to permit the disc to be frictionally driven, as will soon be described.

In the illustrated embodiment, two separate motors 120 and 160 are provided. Preferably, the motor 120 is a relatively low speed unidirectional motor and is adapted for constant operation when power is supplied to the dictation apparatus. A pulley 122, coupled to motor 120 receives a drive belt 124 entrained thereabout to drive a flywheel 126 associated with capstan 128. Thus, capstan 128 is continually driven by the motor 120. Drive belt 124 is played about capstan flywheel 126 and, additionally, is in driving contact with a slip-clutch pulley 130. Pulley 130 is secured to a drive shaft 132 which, in turn, is journalled for rotation in a support sleeve 134. As shown in FIGS. 2 and 4, support sleeve 134 is at one end of a pivoting crank arm 136. Pivoting crank arm 136 has legs 136a and 136b (FIG. 4) disposed at an angle to each other. At the juncture of legs 136a and 136b an access bore 136c is provided to accommodate a pivot shaft 137. A pivoting crank arm actuator 138 is provided at the end of leg 136b.

Pivot shaft 137, which may be formed on the chassis, is positioned such that, as the pivoting crank arm 136 pivots thereabout, drive shaft 132 is urged into or out of contact with the rim of the take-up reel disc 116. More particularly, and as viewed in FIG. 2, when a force is applied to the pivoting crank arm actuator 138 so as to pivot crank arm 136 counterclockwise about pivot shaft 137, drive shaft 132 is urged away from the rim of the take-up reel disc 116. Conversely, when a force is applied to the pivoting crank arm actuator 138 to pivot crank arm 136 in the clockwise direction (FIG. 2), drive shaft 132 is urged into contact with the rim of the reel disc 116. Since pulley 130 and drive shaft 132 are continuously rotated by the motor 120, contact between drive shaft 132 and the take-up reel disc 116 applies a driving force to the reel disc. As this disc is so driven, tape is moved from the supply reel to the take-up reel. As tape is payed out from the supply reel, the diameter of the tape spool wound on the take-up reel increases. Consequently, the angular velocity of the take-up reel disc need not be as high to take up the tape which is moved at constant speed by the capstan; and the drive shaft can be driven at a slower speed. But since the drive shaft 132 is driven at a relatively constant speed by motor 120, it effectively is over-driven with respect to reel disc 116. Slip-clutch pulley 130 accounts for this over-drive so that there is slippage between pulley 130 and drive shaft 132. This provides proper tension in the tape as it is wound onto the take-up reel.

The motion imparted to the take-up spindle is utilized to drive the tape indicator system. To this end take-up reel pulley 114 is coupled to another pulley 142 by a drive belt 140. A worm gear 144 is integrally formed or may be secured to the shaft of pulley 142 and is in meshing engagement with a gear 146. Gear 146 is coupled to a slide indicator drive pulley 148 which, in turn, is coupled to the slide indicating mechanism (not shown) by a drive belt 150. Thus, as the take-up reel rotates, the slide indicator drive pulley 148 is also rotated proportionately, thereby resulting in a corresponding movement of the slide indicator mechanism. This movement can be observed by the operator as the movable slide lever 46 (FIG. 1) is displaced along the slide indicator 44.

The motion imparted to the supply reel pulley 144 is utilized to actuate the tape footage counter mechanism. To this end supply reel pulley 104 is coupled by a drive belt 152 to a pulley 154. A drive shaft 156 coupled to pulley 154 drives a digital counter 158 mounted on a suitable frame member 82 of the chassis 80. Thus, when the supply reel rotates, a corresponding rotation is effected in the counter pulley 154, resulting in a concomitant change in the count indicated by the counter 158. Thus, counter mechanism 158 can be used as the tape footage counter 70 (FIG. 1).

As shown in FIG. 3, drive shaft 156 also is secured to a chopper wheel 155. Chopper wheel 155 rotates with pulley 154 to periodically interrupt a light beam (not shown) so that, if there is a break in the tape, the supply reel and chopper wheel 155 will not rotate. Thus the light beam will not be interrupted. This condition is sensed by suitable control circuitry (not shown) and such condition is indicated by the control indicators 42 (FIG. 1).

In reversing the direction of tape travel for rewind, and in certain instances for forward tape travel, it is desirable to advance the tape at high speed. Preferably, the source of this high speed motive power is a single bi-directional motor 160. Alternatively, separate high speed, unidirectional motors can be provided. The drive shaft of motor 160 is coupled by a pulley 162 and drive belt 164 to an idler pulley 166, which, in turn, is coupled by a drive belt 168 to a drive roll pulley 170. Drive roll pulley 170 is rotated at a relatively high speed in the clockwise or counterclockwise direction, depending upon the rotational direction of motor 160.

Drive roll pulley 170 is secured to a drive shaft 172 whose upper portion terminates in a free end 172a. Secured near the upper portion of drive shaft 172 is a drive roll 174. As will soon be described, the assembly comprised of the drive roll pulley 170, drive shaft 172 and drive roll 174 is adapted to be displaced in a generally lateral direction. Accordingly, to support this assembly in the upright position indicated in FIG. 2, a support link 173, best seen in FIG. 4, is provided, and link 173 is pivoted at 175. However, it should be pointed out that this support link merely insures the proper upright positioning of drive shaft 172 and does not cause or contribute to the generally lateral displacement of the drive shaft.

A string member 176, which may be formed of any suitable material, such as a polyester cord, a wire, nylon strands, or the like, has its opposite ends secured by spring members 178a and 178b, respectively, to suitable posts 180a and 180b, respectively, secured to the chassis 80. The spring members 178a and 178b resiliently tension the string member 176. An intermediate portion 182 of the string member is deployed by being wrapped about the upper end portion 172a of the drive shaft 172 to thus "capture" the drive shaft.

The frictional forces between the tensioned string member 176 and the captured drive shaft 172 imparts a lateral movement to the drive shaft so that the drive shaft effectively "walks" along the string member when rotated. For example, when motor 160 rotates drive shaft 172 in a clockwise direction, as viewed in FIG. 2, drive shaft 172 tends to be displaced in the right-hand direction. This displacement of drive shaft 172 urges drive roll 174 into contact with take-up reel disc 116. In the preferred embodiment of the illustrated apparatus, drive roll 174 frictionally drives the reel disc 116. Accordingly, drive roll 174, or at least its peripheral surface, is formed of suitable material (such as rubber or the like) to exert such a frictional drive. As the drive roll rotates in a clockwise direction take-up reel disc 116 is driven in a counterclockwise direction and tape is transported from the supply reel to the take-up reel, as in a fast-forward mode.

Conversely, if motor 160 is reversed to rotate drive shaft 172 in a counterclockwise direction, the frictional forces between drive shaft 172 and the tensioned string member 176 imparts an opposite lateral movement to the drive shaft so that the drive shaft "walks" along the string member in the left-hand direction. This lateral displacement of the drive shaft urges the drive roll 174 into contact with the supply reel disc 106, thereby driving the supply reel in the clockwise direction at a relatively fast speed, as in the rewind mode.

The selective contact of drive roll 174 with either supply reel disc 106 or take-up reel disc 116 is determined by the direction of rotation of drive shaft 172. Once positioned adjacent supply reel disc 106 or take-up reel disc 116 drive roll 174 will remain in contact even after high speed motor 160 has stopped. In order to place the apparatus in condition for normal slow speed operation, drive roll 174 must be moved out of contact with discs 106 or 116.

In either the rewind or fast-forward mode, the driving force of drive roll 174 against reel disc 106 or 116 is substantially assisted by a self-locking effect created by selection of certain geometric parameters including location of pivot point 175, spindle shafts 106a and 116a and the diameters of discs 106 and 116 and the diameter of drive roll 174.

As best seen in FIG. 4, where reel discs 106, 116 and drive roll 174 are shown in dotted line, when drive roll 174 is in driving contact with either reel disc 106 or 116 mechanical resistance to the rotation of either reel disc 106 or 166, for example when tape is rewound or moved in a fast-forward mode, creates frictional forces at the rim of drive roll 174. These forces urge drive roll 174 into tighter contact with reel discs 106 or 116. In essence, the drive mechanism becomes self-adjusting providing increased drive capability in response to increased load.

This feature eliminates the necessity to create a high string tension in string member 176 which minimizes the power required to rotate drive shaft 172 and drive roll 174 and also minimizes excessive wear due to the frictional rubbing of drive shaft 172 and string member 176.

Normal forward speed operation dictates that the transducer head be moved inwardly to contact the tape in the cassette. Such movement is determined by a solenoid and mechanical linkage. The mechanical linkage includes a yoke member 184 which is secured to a link member 190. The yoke member 184 includes a cut-out 186 and a bifurcated end portion 188. As shown, bifurcated end portion 188 extends outwardly from cut-out 186, and its legs taper outwardly to form cammed surfaces. As will be described, yoke 184 moves longitudinally between first and second extreme positions. In one of these positions, drive shaft 172 is disposed within cut-out 186. In the other extreme position, the yoke is effectively cleared of drive shaft 172. Alternatively, the drive shaft can be disposed between the remote ends of the legs of the bifurcated portion 188 when the yoke is in its other extreme position. The lateral displacement of the drive shaft 172 is constrained when the drive shaft is disposed in cut-out 186, which functions as a detent, but this constraint is removed when the yoke member is moved to its other extreme position.

The longitudinal movement of yoke member 184 is determined by the link member 190 which is mechanically coupled to the armature 202 of a solenoid 204. Thus, when solenoid 204 is selectively energized, its armature 202 moves between a fully extended position (shown in FIG. 2) and a fully retracted position (shown in FIG. 3) relative to the solenoid housing. This movement of solenoid armature 202 results in a corresponding longitudinal movement of link member 190 and yoke member 184. In addition to moving yoke member 184, link member 190 pivots the aforedescribed pivot arm 136. For this purpose, the link member 190 is provided with an abutment 192 fixed so as to contact pivoting crank arm actuator 138 and an actuator coupling spring 194 which resiliently couples actuator 138 to link member 190.

With this arrangement, when solenoid armature 202 is in its fully extended position, abutment 192 contacts pivoting crank arm actuator 138 to pivot crank arm 136 in a counterclockwise direction, as viewed in FIGS. 2 and 3 (clockwise in FIG. 4). Conversely, when solenoid armature 202 is in its fully retracted position, the movement of link member 190 exerts a corresponding resilient force on pivoting crank arm actuator 138 through the coupling spring 194 to pivot arm 136 in a clockwise direction as seen in FIGS. 2 and 3 (counterclockwise in FIG. 4).

In addition to selectively limiting the lateral displacement of drive shaft 172 and controlling the pivoting motion of arm 136, solenoid 204 also controls a record or playback operation. That is, when a record or playback operation is to be performed, a record/playback head must be brought into contact with the magnetic tape and a pressure roller must be urged against the capstan so as to move the tape past the head. Conversely, when a record or playback operation is terminated, the record/playback head is withdrawn from the tape and the pressure roller is moved away from the capstan. This movement of the head and pressure roller is determined by the movement of link member 190, as best seen in FIG. 3.

A bridge support member 210 is provided to support a pressure roller 212 and a record/playback head 214. Pressure roller 212 is conventional and functions as an idler roller. The record/playback head 214 also may be conventional and is adapted to record information on or reproduce information from the magnetic tape as determined by the electronic control and processing circuitry (not shown) connected thereto. Bridge member 210 includes legs, such as legs 211, which are pivotally mounted on a pivot rod 230, the latter being secured to the chassis. As described in greater detail in copending Application Ser. No. 678,596, filed Apr. 20, 1976, bridge member 210 is positioned to insure that pressure roller 212 and record/playback head 214 are in proper alignment with the openings in the cassette housing supported on the cassette holder of the dictation apparatus. Legs 211 extend downwardly from the bridge to define a radius of rotation therefor. In this fashion, the bridge (and thus the pressure roller and record/playback head) rotates in a plane which is normal to the direction of movement of the magnetic tape between the supply and take-up reels.

This pivotal movement of bridge member 210 is controlled by link member 190 whose free end 200, which is remote from the solenoid armature 202, is positioned to abute a cross-member of the bridge. In addition, a coupling spring 216 is secured at one end to link member 190 and at its other end to bridge member 210 by a suitable anchor 218. Therefore, as the solenoid armature 202 moves to its fully extended position, the corresponding movement of the link member 190 positions its end portion 200 in abutting relationship against bridge 210 to pivot the bridge away from the tape. Conversely, when solenoid armature 202 is moved to its fully retracted position, the corresponding movement of link member 190 exerts a force on bridge 210 through spring 216 to pivot the bridge toward the tape.

In order to properly align link member 190 and limit its longitudinal movement, a pin 198 is fixed to the chassis and rides in a longitudinal slot 196 on link member 190.

An additional bridge member 220 is provided to support an erase head 224. Bridge member 220 includes legs 221 which are pivotally coupled to pivot rod 230. Although independent of bridge 210, bridge 220 serves to align erase head 224 with a corresponding opening in the tape cassette housing. As is known, the purpose of this erase head is to erase information previously recorded on the tape immediately prior to recording new information thereon. As best seen in FIG. 3, erase head 224 is provided with a tape guide member 226 which properly aligns the tape in respect to the active elements of erase head 224 and record/playback head 214. With this alignment, information is recorded, reproduced and erased properly from a longitudinal track on the tape.

Bridge 220 normally is biased by a spring 223 to urge erase head 224 into contact with the tape. In a preferred embodiment, spring 223 is coupled between bridge member 220 and a pivotable tray (not shown) in the cassette holder. Alternatively, this spring can be coupled to the chassis. Bridge member 220 additionally includes an eject lever 222 which extends from bridge member 220 externally of the machine, and terminates in the eject control 16 shown in FIG. 1. Movement of eject lever 222 by an operator serves to pivot bridge member 220 away from the tape so as to pivot erase head 224 away from the cassette housing. The spring bias force exerted on bridge member 220 by spring 223 pivots the bridge toward the tape when the eject lever 222 is released.

The operation of the bi-directional drive assembly in the environment of a tape transport system now will be described. Futhermore, in order to appreciate the unique features of this apparatus, especially when used in a tape recording and/or playback machine, the following also includes a description of the associated operation of such a machine.

Initially, in operation an operator places a tape cassette in the machine illustrated in FIG. 1. To do so, eject control 16 (and thus eject lever 22) is depressed to open the door to the cassette holder compartment 14 and to pivot bridge 220 out of the way. With bridge 220 away there is sufficient clearance between the erase head 224 and the cassette holder, thereby enabling the cassette to be placed in the cassette holder. The door to the cassette holder compartment is now closed and bridge 220 is urged toward the tape under the influence of the spring bias force exerted by spring 223 (FIG. 4).

With the cassette so placed in the cassette holder compartment, the machine is in its quiescent state. That is, the solenoid 204 is in the condition whereby its armature 202 is fully extended (FIG. 2) and bridge 210 is pivoted away from the tape. Consequently, the pressure roller 212 is also spaced from the capstan 128 and the record/playback head 214 is not in contact with the tape. At the same time, yoke 184 is effectively clear of drive shaft 172 so that drive shaft 172 is free to undergo its lateral displacement responsive to operator selection of either a fast-forward or reverse wind mode. However, in the quiescent state, motor 160 is not energized and, therefore, the drive roll 174 is not actuated.

In the quiescent state solenoid armature 202 is in its fully extended position with abutment 192 on the link member 190 in contact with pivoting crank arm actuator 138 (seen in FIG. 2) to position crank arm 136 so that drive shaft 132 is away from the take-up reel disc 116. Consequently, if motor 120 is energized, the rotation of drive shaft 132 would not affect the take-up reel. Also, even though the capstan 128 is rotating, it is not capable of moving the tape because pressure roller 212 is spaced from the tape.

To record information on the tape, the suitable operator-control element is depressed. Solenoid 204 is energized, as is erase head 224. When the solenoid 204 is energized, its armature 202 is retracted (seen in FIG. 3). Consequently, link member 190 and yoke member 184 are moved in a corresponding direction. When yoke member 184 so moves, one of the legs of the bifurcated portion 188 contacts the drive shaft 172 to displace drive shaft 172 and move it out of contact with either the take-up or supply reel drives.

In addition, the movement of the link member 190 exerts a resilient force on pivoting crank arm actuator 138 through the spring 194 to pivot crank arm 136 in a clockwise direction, as seen in FIGS. 2 and 3 (counter-clockwise in FIG. 4). Drive shaft 132 now is in contact with the rim of take-up reel disc 116 to drive the take-up reel. This assures that proper tension in the tape is provided.

Movement of link member 190 by the movement of solenoid armature 202 to its fully retracted position removes the end portion 200 from contact with bridge 210. Consequently, the force exerted on bridge 220 by spring 216 pivots the bridge to place pressure roller 212 against capstan 128 and record/playback head 214 into contact with the tape. Hence, tape is moved past the head 214 and information is recorded thereon.

To terminate the record operation, a suitable operator control is actuated. This places the apparatus once again in its quiescent mode, that is, solenoid 204 is de-energized and solenoid armature 202 moves to its fully extended position (FIG. 2). This movement of the solenoid armature moves link member 190 and yoke member 184. Consequently, the constraint on the lateral displacement of drive shaft 172 is removed. Additionally, movement of link member 190 pivots drive shaft 132 away from the take-up reel disc 116, and pivots bridge 210 away from the tape. Since the capstan now does not drive the tape, and since the drive shaft 132 now does not drive the take-up reel, movement of the tape is arrested. The inertia, and thus the drag forces, exerted on supply reel pulley 104 and take-up reel pulley 114, by the various elements coupled thereto, is sufficient to rapidly brake the tape to a stop.

To place the apparatus in a tape rewind mode the operator actuates a suitable operator-controlled element to energize the motor 160 to rotate in a "rewind" direction. If rewind mode is actuated and solenoid 204 had been energized prior to the actuation of this control element, it now is de-energized. Thus, solenoid armature 202 is placed into its fully extended position to move cut-out 186 of yoke member 184 away from drive shaft 172. In this position there is no constraint on lateral movement of drive shaft 172. Drive shaft 132 is also pivoted away from take-up reel disc 116 and bridge 210 is pivoted away from the tape. Accordingly, the "rewind" rotation of motor 160 rotates drive roll pulley 170, drive shaft 172 and drive roll 174. Drive shaft 172 "walks" along string member 176 until drive roll 174 contacts reel disc 106. This, in turn, rapidly rotates supply reel disc 106 to rapidly rewind the tape onto the supply reel. At the conclusion of this rewind operation, a suitable stop control is actuated to de-energize motor 160. However, solenoid 204 is maintained in its de-energized condition; and link member 190 is not moved. When motor 160 is de-energized drive roll 174 is stopped to arrest the rotation of supply reel disc 106. Consequently, the apparatus is again returned to its quiescent condition.

To rapidly move the tape in a forward direction, a suitable fast-forward control is actuated. This has precisely the same effect as the aforedescribed actuation of the rewind control, however motor 160 now is energized to rotate in its opposite, or "fast-forward" direction. This rotates drive roll pulley 170, drive shaft 172 and drive roll 174 in the opposite direction. Consequently, drive shaft 172 is laterally displaced so as to effectively "walk" along string member 176 until drive roll 174 contacts the rim of take-up reel disc 116. Drive roll 174 now drives the take-up reel so as to rapidly wind the tape thereon. Once the stop control is actuated the machine returns to its aforedescribed quiescent condition.

Detailed operation of the illustrated apparatus during a playback mode will not be described. It is apreciated that the illustrated elements cooperate in the same manner as during a record mode, except that erase head 224 would not be energized.

It is seen that one feature of the present invention is to provide a single multi-purpose solenoid, such as solenoid 204, capable of controlling disparate functions. The two extreme positions of the solenoid armature are exploited without the need for providing an intermediate position. Thus, the use of additional and complex circuitry which would be needed to operate a conventional two-position solenoid as a three-position solenoid is avoided. Rather, the illustrated apparatus is controlled in response only to the single "throw" of the solenoid; that is, the movement of the solenoid armature from one to the other of its extreme positions. Furthermore, an additional solenoid to control the position, or lateral displacement, of drive shaft 172, is eliminated. Consequently, the illustrated drive apparatus can be used in a tape transport system, and offers the desirable features of simplified construction, light weight, low mass, minimum noise and low power requirements.

While the present invention has been particularly shown and described with reference to use as a tape transport system, it should be readily apparent that this invention finds broad application as driving apparatus for selectively driving either of two spaced apart rotary members. These rotary members can be used for any general purpose and need not be limited to a tape transport system or to a web driving mechanism. Furthermore, it is apparent that one of ordinary skill in the art can make various changes and modifications in the form and details of the apparatus described herein without departing from the spirit and scope of the invention. Accordingly, it is intended that the appended claims be interpreted as including all such changes and modifications.

What is claimed is:

1. Apparatus for selectively imparting rotary motion to two spaced apart rotatable members, comprising: drive roll means having a drive shaft and a drive portion for contacting a mating portion of a selected one of said rotatable members; bi-directional drive means coupled to said drive roll means; a tensioned string member having an intermediate portion thereof deployed about the drive shaft of said drive roll means, said drive shaft and said drive roll means being displaced along a predetermined path from a first position in driving contact with one of said rotatable members to a second position in driving contact with the other of said rotatable members when said drive means changes the direction of rotation of said drive shaft by slipping relative to said string member deployed about said drive shaft; and a stop member selectively interposed into said predetermined path for preventing said drive shaft from being sufficiently displaced to urge said drive roll means into contact with either rotatable member.

2. Apparatus for selectively imparting rotary motion to two spaced apart rotatable members, comprising: drive roll means having a drive shaft and a drive portion for contacting a mating portion of a selected one of said rotatable members; bi-directional drive means coupled to said drive roll means; a tensioned string member having an intermediate portion thereof deployed about the drive shaft of said drive roll means, said drive shaft and said drive roll means being displaced along a predetermined path from a first position in driving contact with one of said rotatable members to a second position in driving contact with the other of said rotatable members when said drive means changes the direction of rotation of said drive shaft by slipping relative to said string member deployed thereabout, and a stop member selectively interposed into said predetermined path for preventing said drive shaft from being sufficiently displaced to urge said drive roll means into contact with either rotatable member, said stop member comprising a yoke member terminating in a bifurcated end portion, said yoke member being movable between a first position with said end portion positioned to limit lateral displacement of said drive shaft to preclude contact with said rotatable members and a second position with said end portion displaced away from said drive shaft such that said drive shaft may be laterally displaced.

3. Apparatus for selectively imparting rotary motion to two spaced apart rotatable members, comprising: drive roll means having a drive shaft and a drive portion for contacting a mating portion of a selected one of said rotatable members; bi-directional drive means coupled to said drive roll means; and a tensioned string member having an intermediate portion thereof deployed about the drive shaft of said drive roll means, said drive roll means being laterally movable between a first position in contact with one of said rotatable members when said drive means drives said drive roll means in one direction and a second position in contact with the other of said rotatable members when said drive means drives said drive roll means in the opposite direction; and wherein said drive roll means and said rotatable members are dimensioned and geometrically arranged such that rotation of said drive roll means when in contact with a selected one of said rotatable members utilizes surface friction to more intimately move said drive roll means into contact with said selected one of said rotatable members.

4. Apparatus for bi-directionally moving a web of material between first and second reels, comprising: a first spindle for driving said first reel in a first direction; a second spindle for driving said second reel in an opposite direction; a first rotary member on said first spindle having a rim adapted to be frictionally driven; a second rotary member on said second spindle having a rim adapted to be frictionally driven; drive roll means having a drive shaft and a peripheral surface for selectively contacting said rim of said first rotary member on said first spindle and said rim of said second rotary member on said second spindle; means for selectively bi-directionally driving said drive shaft; and a tensioned string member having an intermediate portion thereof deployed about said drive shaft, said drive shaft being laterally movable between a first position in driving contact with said rim of said first rotary member on said first spindle to a second position in driving contact with said rim of said second rotary member on said second spindle, said lateral movement of said drive shaft between said first and second positions being responsive to the direction of rotation of said selectively bi-directional driving means thereby to drive said first spindle in one direction when said drive shaft is in said first position and to drive said second spindle in the opposite direction when said drive shaft is in said second position.

5. The apparatus as defined in claim 4 wherein said bi-directional driving means comprises a bi-directional motor coupled to said drive shaft for rotating said drive shaft in said one direction whereby said drive shaft is displaced along said string member toward said drive means on said first spindle, and for rotating said drive shaft in said opposite direction whereby said drive shaft is displaced along said string member toward said drive means on said second spindle.

6. Apparatus for bi-directionally moving a web of material between first and second reels, comprising: a first spindle for driving said first reel in a first direction; a second spindle for driving said second reel in an opposite direction; a first rotary member on said first spindle having a rim adapted to be frictionally driven; a second rotary member on said second spindle having a rim adapted to be frictionally driven; drive roll means having a drive shaft and a peripheral surface for selectively contacting said rim of said first rotary member on said first spindle and said rim of said second rotary member on said second spindle; means for selectively bi-directionally driving said drive shaft, said bi-directional driving means comprising a bi-directional motor coupled to said drive shaft for rotating said drive shaft in one and opposite directions, respectively; a tensioned string member having an intermediate portion thereof deployed about said drive shaft, said drive shaft being displaced along said string member toward a first position in driving contact with said rim of said first rotary member on said first spindle when said drive shaft is rotated in said one direction and toward a second position in driving contact with said rim of said second rotary member on said second spindle when said drive shaft is rotated in said opposite direction thereby to drive said first spindle in one direction when said drive shaft is in said first position and to drive said second spindle in the opposite direction when said drive shaft is in said second position; a solenoid having an armature; a link member coupled to said armature and movable therewith; and stop means coupled to said link member and selectively disposable in the displacement path of said drive shaft to prevent said drive shaft, when said stop means is disposed in the displacement path of said drive shaft, from being displaced for said drive roll means to effectively drive said first and second spindles.

7. The apparatus as defined in claim 6 wherein said stop means comprises a bifurcated member; and said drive shaft is relatively positionable between the legs of said bifurcated member.

8. In a tape recording and/or playback machine of the type wherein tape is driven in a fast-forward mode from a supply reel to a take-up reel and in a rewind mode from said take-up reel to said supply reel, and wherein said machine includes a single multi-purpose tape controlling solenoid energizable to a first or second condition, apparatus for selectively controlling the movement of said tape, comprising a rotatable supply reel disc member and a rotatable take-up reel disc member; drive roll means having a drive shaft and a peripheral surface for selectively contacting a peripheral surface on said supply reel and take-up reel disc members; means or bidirectionally driving said drive shaft; a tensioned string member having an intermediate portion deployed about said drive shaft; and control means coupled to said solenoid and operative when said solenoid is in said first condition to maintain said drive roll means out of contact with said supply reel and take-up reel disc members, and operative when said solenoid is in said second condition to displace said control means such that said drive roll means is free to selectively contact one of said supply reel and take-up reel disc members, whereby rotation of said drive shaft in one direction displaces said drive shaft along said string member to move said drive shaft and drive roll means into driving contact with said supply reel disc member and rotation of said drive shaft in the opposite direction displaces said drive shaft along said string member to move said drive shaft and drive roll means into driving contact with said take-up reel disc member.

9. The apparatus as defined in claim 8, wherein said bi-directional driving means comprises a high speed motor; and transmission means for coupling the rotary motion of said motor to said drive shaft.

10. The apparatus as defined in claim 9, wherein said high speed motor is bi-directional.

11. In a tape recording and/or playback machine of the type wherein tape is driven in a fast-forward mode from a supply reel to a take-up reel and in a rewind mode from said take-up reel to said supply reel, and wherein said machine includes a single multi-purpose tape controlling solenoid energizable to a first or second condition, apparatus for selectively controlling the movement of said tape, comprising a rotatable supply reel disc member and a rotatable take-up reel disc member; drive roll means having a drive shaft and a peripheral surface for selectively contacting a peripheral surface on said supply reel and take-up reel disc members; means for bi-directionally driving said drive shaft; a tensioned string member having an intermediate portion deployed about said drive shaft, whereby rotation of said drive shaft in one direction displaces said drive shaft along said string member to move said drive shaft and drive roll means into driving contact with said supply reel disc member and rotation of said drive shaft in the opposite direction displaces said drive shaft along said string member to move said drive shaft and drive roll means into driving contact with said take-up reel disc member; and control means coupled to said solenoid and operative when said solenoid is in said first condition to maintain said drive roll means out of contact with said supply reel and take-up reel disc members, and operative when said solenoid is in said second condition to displace said control means such that said drive roll means is free to selectively contact one of said supply reel and take-up reel disc members, said control means comprising a yoke member having detent means for contacting said drive shaft to thereby prevent said drive roll means from being displaced into contact with said supply reel or take-up reel disc members; and link means for mechanically linking said yoke member to the armature of said solenoid, whereby said link means displaces said yoke member to move said detent means away from said drive shaft when said solenoid is in said second condition; thereby enabling said drive shaft and said drive roll means to be displaced into selected contact with one of said reel disc member.

12. The apparatus as defined in claim 11 further comprising a pivotal idler arm for supporting said drive shaft.

13. The apparatus as defined in claim 11 further comprising a record and/or playback transducer; a tape-driving pressure roller; and a movable support member for supporting said transducer and said pressure roller, said support member being coupled to said link means, whereby said transducer and pressure roller are urged into contact with the tape extending between said supply and take-up reels when said solenoid is in said first condition and are urged away from said tape when said solenoid is in said second condition.

14. The apparatus as defined in claim 13 further comprising a low speed motor; a drive shaft coupled to said low speed motor; and a pivot arm for pivotally supporting said low speed motor drive shaft and mechanically coupled to said link means, whereby said low speed motor drive shaft is pivoted into contact with said peripheral surface of said take-up reel disc member when said solenoid is in said first condition and said drive shaft is pivoted out of contact with said peripheral surface of said take-up reel disc member when said solenoid is in said second condition.

15. The apparatus as defined in claim 11 wherein said detent means comprises a bifurcated portion of said yoke having respective cammed surfaces for moving said drive shaft and drive roll means away from said respective reel disc member when said solenoid is activated from said second condition to said first condition.

* * * * *